(12) United States Patent
Childers

(10) Patent No.: US 7,310,456 B1
(45) Date of Patent: Dec. 18, 2007

(54) MULTI-CORE OPTICAL FIBER PRESSURE SENSOR

(75) Inventor: Brooks Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/445,765

(22) Filed: Jun. 2, 2006

(51) Int. Cl.
*G02B 6/00* (2006.01)
*G02B 6/34* (2006.01)

(52) U.S. Cl. .............................. 385/13; 385/12; 385/37

(58) Field of Classification Search ...................... None
See application file for complete search history.

(56) References Cited

U.S. PATENT DOCUMENTS

| | | | |
|---|---|---|---|
| 2002/0041724 A1* | 4/2002 | Ronnekleiv et al. | 385/12 |
| 2003/0209655 A1* | 11/2003 | Wang | 250/227.14 |
| 2004/0179765 A1* | 9/2004 | Kersey et al. | 385/12 |

* cited by examiner

*Primary Examiner*—Tina M. Wong
(74) *Attorney, Agent, or Firm*—Cantor Colburn LLP

(57) ABSTRACT

A multi-core optical fiber pressure sensor is described, which sensor includes an optical fiber having at least two cores, wherein the cores have collocated measurement portions, for example in-fiber interferometers or Bragg Grating portions. In an exemplary embodiment, the fiber is arranged such that a pressure induced force will act on the multi-core fiber at said collocated position, affecting the light guiding cores in a different manner. In another exemplary embodiment, the optical fiber is configured to bend in response to pressure changes.

21 Claims, 3 Drawing Sheets

MULTI-CORE OPTICAL FIBER PRESSURE SENSOR

BACKGROUND

Optical fiber pressure sensors, particularly those utilized in harsh environments, such as in downhole environments, are predominantly plagued by temperature changes and drift sources. Thus, where measurement is attempted, additional sensors have been required to attempt to compensate for such temperature changes, and drift of the measurement. For example, two pressure sensors might be employed near each other having different sensor characteristics (i.e., different responses to the undesired parameter), and calculations may be made in an attempt to eliminate the effect of the parameter on the measurement (effectively in an attempt to isolate the parameter of interest, e.g., temperature effects at the point of interest).

While this may appear to be a good solution, conditions at the two sensors must be exact to accurately eliminate the influences of the undesired parameter. Also, the need to set up and run multiple sensors at every measurement point of interest can be tedious and costly.

What is needed in the art is a simple, low cost solution to elimination of temperature changes and drift sources in optical fiber pressure sensors.

SUMMARY

The above-described and other problems and deficiencies of the prior art are overcome and alleviated by the presently described multi-core optical fiber pressure sensor, which includes an optical fiber having at least two cores, wherein the cores have collocated measurement portions, for example, in-fiber interferometers or Bragg grating portions. In an exemplary embodiment, the fiber is arranged such that a pressure induced force will act on the multi-core fiber affecting the collocated measurement portions in a different manner. In another exemplary embodiment, such arrangement causes one grating to be in compression and another to be in tension. In another exemplary embodiment, the fiber is actuated by a pressure sensitive bellows or diaphragm. In another exemplary embodiment, the fiber is actuated by a force normal to the axis of the fiber. In another exemplary embodiment, the fiber is asymmetrically actuated along a longitudinal axis of the fiber.

In other exemplary embodiments, different portions of the multi-core fiber are engineered to react differently to pressure, and light guiding cores in the collocated measurement portions are configured to sense pressure. In an exemplary embodiment, the fiber contains a lower modulus core near a first light guiding core and a higher modulus core near a second light guiding core. The provision of the multi-core fiber and the differential reaction of the pressure to the fiber portions containing the lower and higher modulus cores, respectively, at the measurement portions of the multiple cores, eliminate temperature changes or drift sources that might otherwise affect the measurements. In another exemplary embodiment, the multi-core fiber comprises at least two cores that have the same doping. In another embodiment, at least two cores are reflective to the same wavelength.

In other exemplary embodiments, a reference pressure acts on a multi-core fiber in addition to a well bore (or other application) pressure. In such embodiment, the multi-core fiber contains at least two light guiding cores provided in different spatial relationship relative to a hollow core. The hollow core acts as a port causing different pressure induced reactions with regard to the light guiding cores.

The above-discussed and other features and advantages of the presently described multi-core optical fiber pressure sensor will be appreciated and understood by those skilled in the art from the following detailed description and drawings.

BRIEF DESCRIPTION OF THE DRAWINGS

Referring now to the drawings, wherein like elements are numbered alike in the several FIGURES.

DETAILED DESCRIPTION OF EXEMPLARY EMBODIMENTS

Reference will now be made in detail to exemplary embodiments, examples of which are illustrated in the accompanying drawings.

Figure 1:
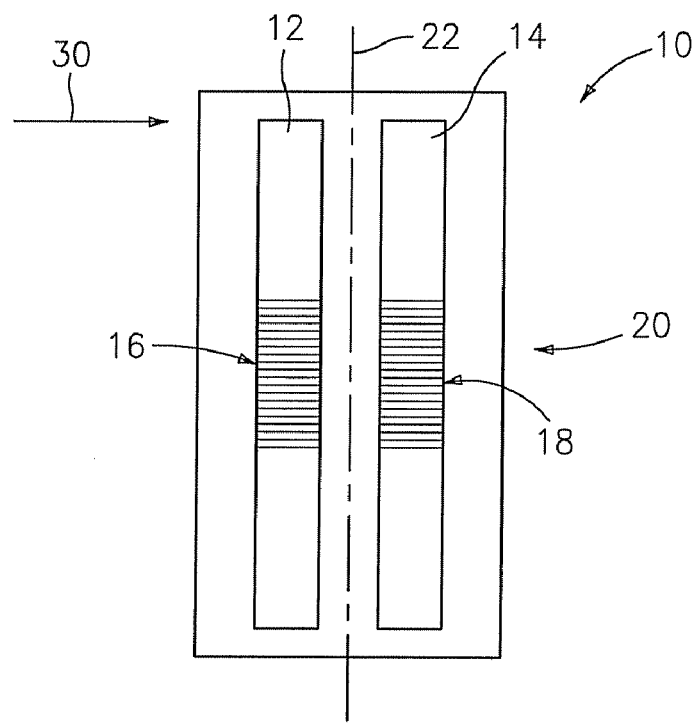
FIG. 1 is a cross-sectional plan view of an exemplary multi-core fiber utilizing Bragg Gratings at a same distance along the fiber.

Referring now to FIG. 1, a cross-sectional plan view of an exemplary multi-core fiber is illustrated generally at 10. A first core 12 and a second core 14 include Bragg grating portions 16, 18 at a same measurement portion, shown generally at 20, relative to a longitudinal axis, illustrated by line 22, of the fiber 10.

The grating portions 16 and 18 may be written in the cores by any fashion and at any time. However, in an exemplary embodiment, the grating portions 16 and 18 are photo etched in cores 12 and 14 during fiberization. More specifically, the grating portions are written during the drawing process and prior to the application of a protective coating. In such exemplary embodiment, the collocated sensors are particularly insensitive to drift factors since all collocated grating portions will drift together.

Also, while the above exemplary embodiment describes use of Bragg gratings, it should be recognized that other structures useful for reading out such fibers may be used, such as in-fiber interferometers, Rayleigh scatter and random photo etched structures, among others, as long as collocated measurement portions are provided in the fiber.

Figure 2:
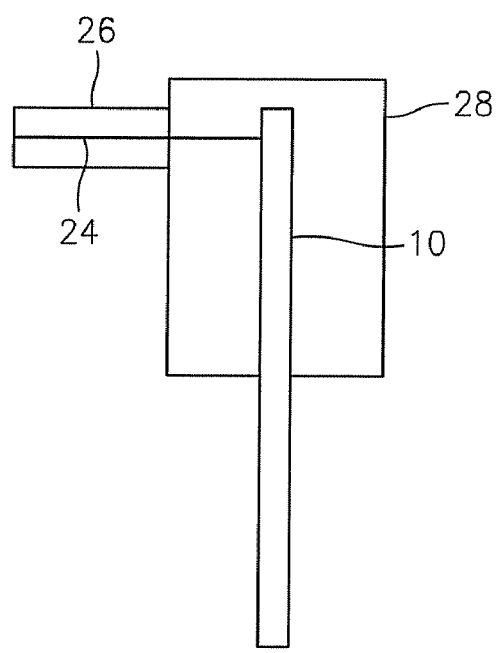
FIG. 2 is a cross-sectional plan view of an exemplary multi-core fiber actuated by a push rod and bellows.

Referring now to FIG. 2, a cross-sectional plan view of an exemplary multi-core fiber 10 is illustrated in a system designed to actuate the fiber by a push rod 24 and bellows 26. The push rod 24 extends from the bellows normally against the multi-core fiber, which is provided in a media isolated housing 28. The bellows 26 is responsive to a pressure change to cause the push rod 24 to bend the fiber 10.

Referring back to FIG. 1, it is noted that the push rod 24 and bellows 26 is an exemplary mechanism to provide the pressure-induced force on the fiber illustrated by arrow 30. Such force 30 bends the fiber 10, placing exemplary grating 16 in tension and exemplary grating 18 in compression. Differential measurements in core 12 and 14 may then be taken to sense the pressure change. It is noted that not only are drift factors eliminated due to the collocated nature of the core measurement portions (e.g., gratings written during fiberization in multiple cores of a multi-core fiber), but temperature effects are also eliminated due to the nature of the multi-core system. In another exemplary embodiment, the multi-core fiber comprises at least two cores that have the same doping to minimize differential reactions to pressure. In another embodiment, at least two cores are reflective to the same wavelength.

Figure 3:
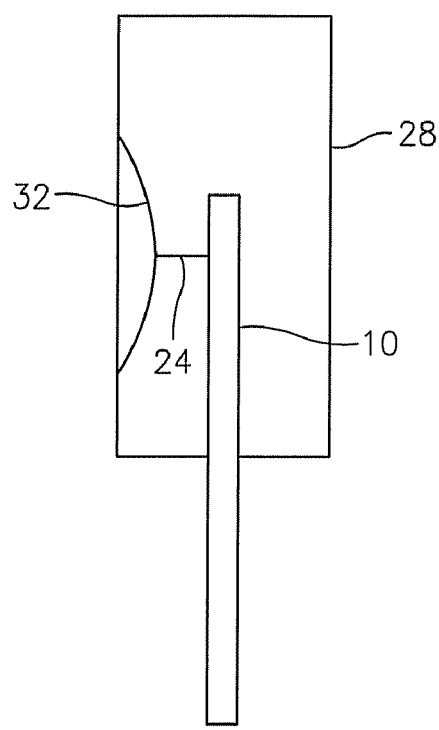
FIG. 3 is a cross-sectional plan view of an exemplary multi-core fiber actuated by a push rod and diaphragm.

Referring now to FIG. 3, a cross-sectional plan view of an exemplary multi-core fiber 10 is illustrated as being actuated by a push rod 24 and diaphragm 32. Other than use of the diaphragm 32 instead of the bellows 26, operation of the collocated sensor system is identical to that described above with regard to FIG. 2. It should be noted that any mechanism effective to transmit a force representative of pressure against the fiber is contemplated herein, the bellows and push rod and diaphragm and push rod embodiments being merely exemplary.

Figure 4:
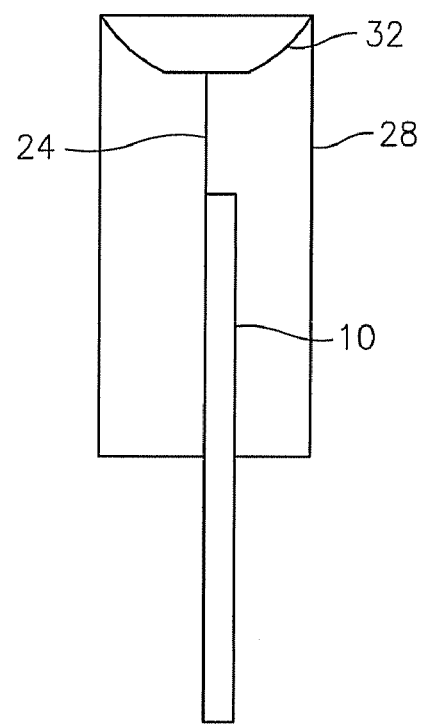
FIG. 4 is a cross-sectional plan view of an exemplary multi-core fiber asymmetrically actuated by a push rod and diaphragm.

Referring now to FIG. 4, a cross-sectional plan view of an exemplary multi-core fiber 10 is illustrated as being asymmetrically actuated by a push rod 24 and diaphragm. It should be recognized that any kind of actuation on the fiber may be performed, as long as the core measurement portions (20 in FIG. 1) of cores 12 and 14 are differentially affected by a force representative of a pressure change.

Figure 5:
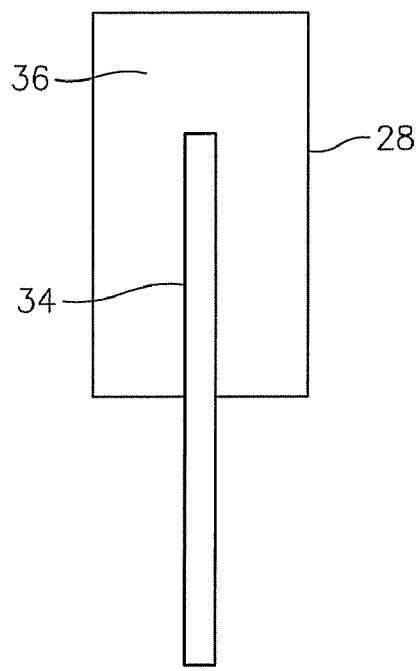
FIG. 5 is a cross-sectional plan view of an exemplary multi-core fiber actuated by well pressure.
Figure 6:
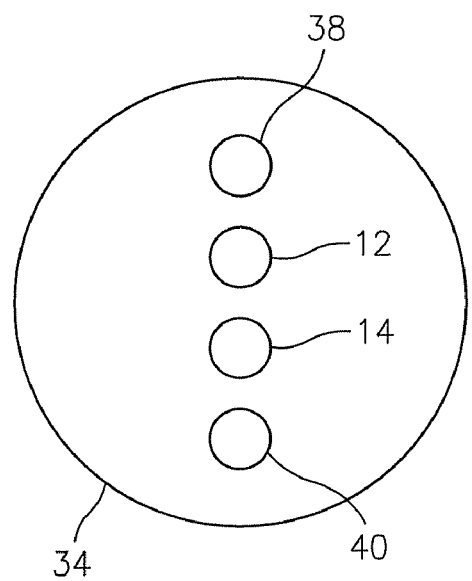
FIG. 6 is a cross-sectional view of an exemplary multi-core fiber having different modulus cores and light guiding cores.

Referring now to FIG. 5, a cross-sectional plan view of an exemplary multi-core fiber 34 is illustrated as being actuated by well pressure, illustrated generally at 36 as acting on the multi-core fiber 34 within the media isolated housing 28. Referring now to FIG. 6, in this exemplary embodiment, the multi-core fiber 34 includes light guiding cores 12 and 14, as well as a low modulus core 38 and a high modulus core 40. As the well pressure 36 acts on the fiber 34, the low modulus core 38 and the high modulus core 40 react differently, causing the fiber 34 to bend. This bend accordingly affects the light guiding cores 12 and 14 differently (note that cores 12 and 14 should be arranged within the fiber such that they bend differently relative to the effects of the low and high modulus core reactions to pressure), and pressure may be calculated independent of temperature effects and drift factors. Also, while provision of low modulus and high modulus cores have been described with regard to this exemplary embodiment, any fiber construction that causes the fiber to deform under pressure is contemplated, including for example, a single core (provided at least partially along the core measurement portion) having a different modulus than the light guiding cores and having a different spacing with regard to cores 12 and 14. Also, the terms "low modulus" and "high modulus" are merely indicative of a difference in the modulus of the two cores, and are not meant to necessarily imply a great difference in modulus properties between the two cores 38 and 40.

Figure 7:
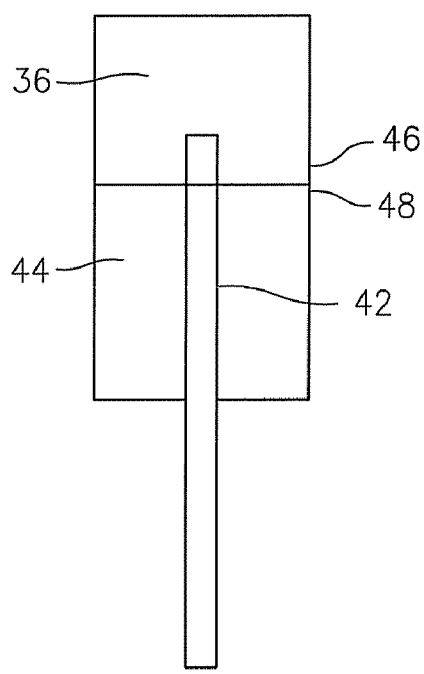
FIG. 7 is a cross-sectional plan view of an exemplary multi-core fiber actuated by well and reference pressures.
Figure 8:
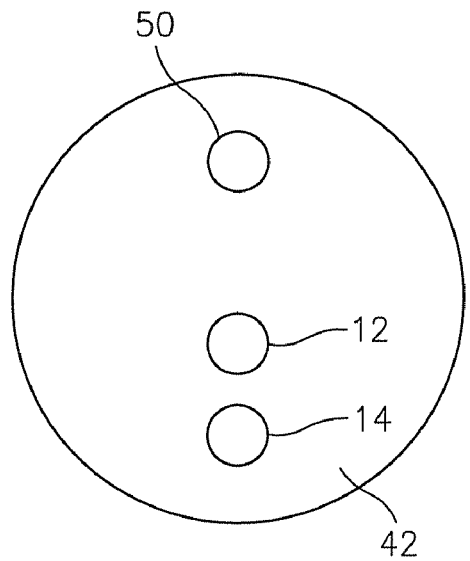
FIG. 8 is a cross-sectional view of an exemplary multi-core fiber having a hollow, port core and light guiding cores.

Referring now to FIG. 7, a cross-sectional plan view of an exemplary multi-core fiber 42 is illustrated as being actuated by well and reference pressures, illustrated generally at 36 and 44, respectively. A media isolated housing 46 is provided over the fiber 42 and includes a pressure seal 48, separating the well and reference pressure zones. Referring now to FIG. 8, the fiber 34 includes light guiding cores 12 and 14, which are differentially spaced relative to a hollow core 50. Hollow core 50 extends from the well pressure zone 36 to the reference pressure zone 38, and causes deformation of the fiber 34 due to the difference in pressure between the reference pressure zone and the well pressure zone. Due to the differential spacing of the cores 12 and 14 relative to the hollow core 50, the bending will affect the light guiding cores 12 and 14 differently, and the change in pressure in the well pressure zone 36 can be measured.

It will be apparent to those skilled in the art that, while exemplary embodiments have been shown and described, various modifications and variations can be made to the embodiments disclosed herein without departing from the spirit or scope of the invention. Accordingly, it is to be understood that the various embodiments have been described by way of illustration and not limitation.

What is claimed is:

1. A pressure sensor, comprising:
   an optical fiber comprising a plurality of light guiding cores, wherein at least two light guiding cores include collocated optical measurement portions,
   wherein the optical fiber is configured to bend in response to a change in environmental pressure incident to said pressure sensor,
   wherein the at least two light guiding cores are positioned within said optical fiber such that they are differentially affected by said bending of said optical fiber, and
   wherein said optical fiber is configured such that interrogation of said collocated optical measurement portions with light generates a temperature and drift corrected pressure measurement.

2. A pressure sensor in accordance with claim 1, further comprising an actuating device configured to bend said optical fiber in response to an environmental pressure change.

3. A pressure sensor in accordance with claim 2, wherein said optical fiber is positioned within a media isolated housing.

4. A pressure sensor in accordance with claim 2, wherein said actuating device is a push rod acted upon a bellows or diaphragm.

5. A pressure sensor in accordance with claim 2, wherein said actuating device generally acts normally on the fiber relative to a longitudinal axis of the fiber.

6. A pressure sensor in accordance with claim 2, wherein said actuating device acts along or near a longitudinal axis of the fiber to asymmetrically load the fiber.

7. A pressure sensor in accordance with claim 1, wherein said optical fiber is configured to bend in response to a change in environmental pressure.

8. A pressure sensor in accordance with claim 7, wherein said optical fiber further comprises a low modulus core and a high modulus core.

9. A pressure sensor in accordance with claim 8, wherein said optical fiber is positioned within a media isolated housing having a zone representative of environmental pressure.

10. A pressure sensor in accordance with claim 7, wherein said optical fiber further comprises a hollow core extending between an environmental pressure zone and a reference pressure zone.

11. A pressure sensor in accordance with claim 10, wherein said fiber is positioned within a media isolated housing having a pressure seal between said environmental pressure and reference pressure zones.

12. A pressure sensor in accordance with claim 1, wherein at least two cores that have the same doping.

13. A pressure sensor in accordance with claim 1, wherein at least two cores are reflective to the same wavelength.

14. A method of sensing pressure, comprising:
- installing, at a point of interest, an optical fiber comprising a plurality of light guiding cores, wherein at least two light guiding cores include collocated optical measurement portions,
- configuring said optical fiber to bend in response to a change in environmental pressure incident to said pressure sensor such that the at least two light guiding cores are differentially affected by said bending of said optical fiber, and
- interrogating said collocated optical measurement portions with light to generate a temperature corrected pressure measurement.

15. A method of sensing pressure in accordance with claim 14, comprising bending said optical fiber with an actuating device configured to move in response to an environmental pressure change.

16. A method of sensing pressure in accordance with claim 15, comprising bending said optical fiber within a media isolated housing.

17. A method of sensing pressure in accordance with claim 15, comprising bending said optical fiber with a push rod acted upon a bellows or diaphragm.

18. A method of sensing pressure in accordance with claim 15, comprising bending said optical fiber in a normal direction relative to a longitudinal axis of the fiber.

19. A method of sensing pressure in accordance with claim 15, comprising asymmetrically loading the fiber by pushing on the fiber along or near a longitudinal axis of the fiber.

20. A method of sensing pressure in accordance with claim 14, comprising bending said fiber by exposing said fiber to an environmental pressure, wherein the fiber is configured to bend in response to a change in environmental pressure.

21. A method of sensing pressure in accordance with claim 14, comprising bending said fiber by exposing said fiber to a reference pressure and an environmental pressure, wherein the fiber is configured to bend in response to a change in environmental pressure.

* * * * *